June 25, 1935.  L. R. BELL  2,005,818
CAMERA
Original Filed July 13, 1934
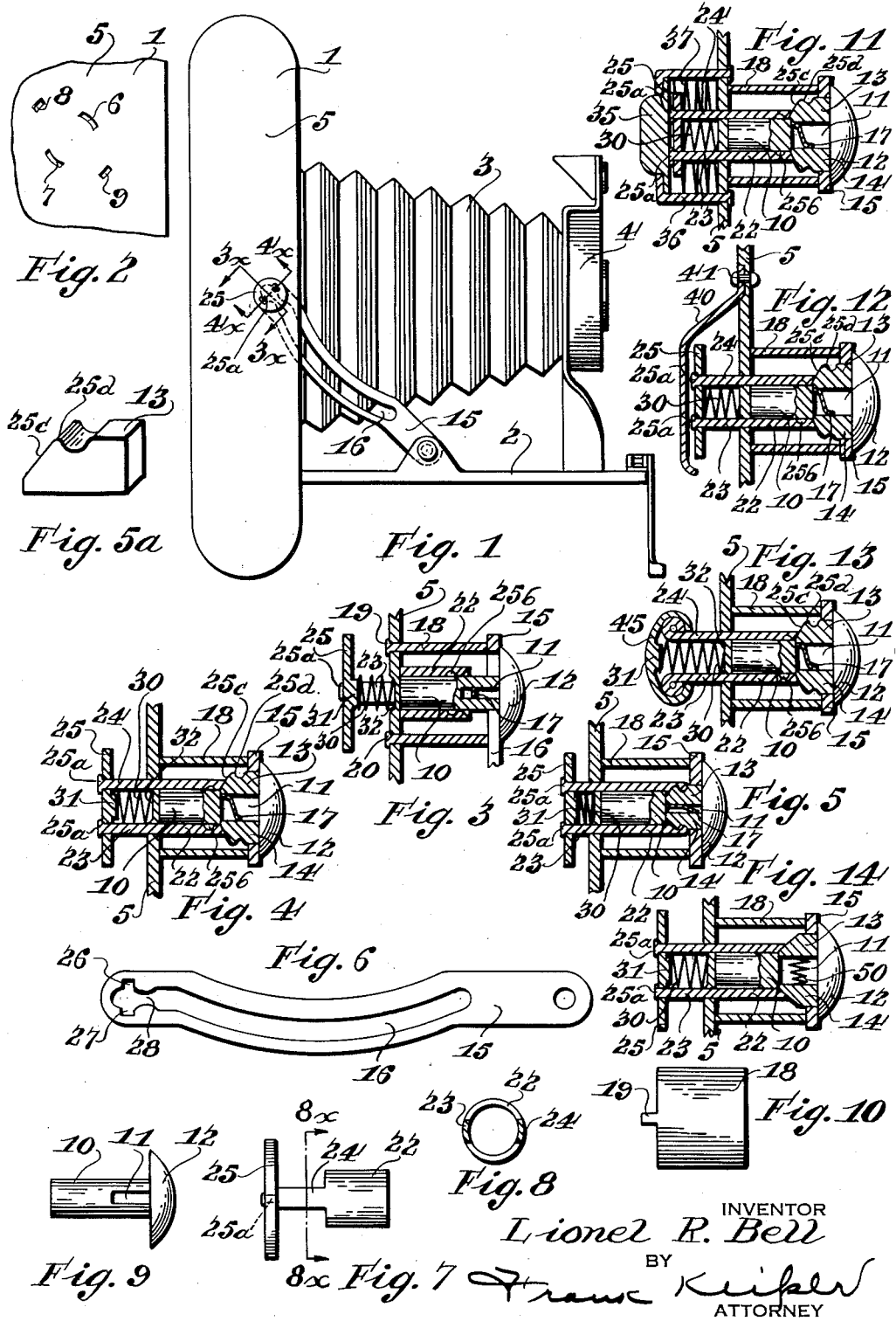
INVENTOR
Lionel R. Bell
BY
Frank Keifer
ATTORNEY Patented June 25, 1935

2,005,818

UNITED STATES PATENT OFFICE 2,005,818

CAMERA

Lionel R. Bell, Rochester, N. Y., assignor to Agfa Ansco Corporation, Binghamton, N. Y., a corporation of New York Application July 13, 1934, Serial No. 734,950
Renewed March 6, 1935

15 Claims. (Cl. 95—40)

The object of this invention is to provide a new and improved device for releasing the links that support the bed of a camera when in open position, so that the camera can be closed by folding the bed up against the box of the camera.

Another object is to provide a device that will positively lock the links against closing when the bed of the camera is in open position.

These and other objects of the invention will be illustrated in the drawing, described in the specification and pointed out in the claims at the end thereof.

In the drawing:

Figure 1 is a side elevation of a folding camera with the bed and bellows in open position.

Figure 2 is an enlarged detail view of one of the side plates of the camera, partly broken away, showing the central part of each side plate with four slots therein.

Figure 3 is a section on the line $3x$—$3x$ of Figure 1, looking in the direction of the arrows.

Figure 4 is a section on the line $4x$—$4x$ of Figure 1, looking in the direction of the arrows.

Figure 5 is a section on the line $4x$—$4x$ of Figure 1, with the parts shown in the position which they will take when the bed of the camera is folded up.

Figure 5a is an enlarged detail view of one of the dogs 13, 14.

Figure 6 is a detail view of the link that supports the bed of the camera.

Figure 7 is a detail view of the push-button and inner sleeve that constitute a part of my invention.

Figure 8 is a section on the line $8x$—$8x$ of Figure 7, looking in the direction of the arrows.

Figure 9 is a detail view of the pin, which constitutes a part of my invention.

Figure 10 is a detail view of the outer sleeve which constitutes a part of my invention.

Figures 11, 12, 13 and 14 are sectional views of modified forms of my invention.

In Figures 2 to 14, inclusive, the parts are shown on a larger scale than appear in Figure 1.

In the drawing like reference numerals indicate like parts.

In the drawing reference numeral 1 indicates the body or box of the camera, and 2 indicates the bed hinged thereon, 3 indicates the folding bellows, and 4 indicates the lens front. The camera box is provided with the side plates 5, 5, each of which are perforated with the two pairs of openings 6 and 7 and 8 and 9, which openings are located centrally of the upper and lower end of the plate and are for a purpose that will presently appear. On the plate 5 is welded or riveted the stud 10 having a slot 11 therein and a head 12, which head may be made integral with the stud, or may be attached thereto later on in the assembling of the parts.

In the slot 11 are placed two dogs 13 and 14. These dogs are engaged by the link 15, which has a slot 16 therein in which the dogs engage. These dogs are normally pressed outward by a blade spring 17 into the position shown in Figure 4, which is the position that the dogs will take when they engage the wide parts of the slot 16 of the link 15. The link 15 is held in sliding engagement between the inside of the head 12 of the stud and the end of the large sleeve 18. The large sleeve 18 has two reduced ends, or projections, 19 and 20 on the end thereof, which reduced ends engage in the slots 8 and 9 of the side plate of the camera and are riveted therein, by which the sleeve is held firmly in place and the link is held in position to engage the dogs 13 and 14.

Mounted on the side plate 5 is the small sleeve 22, which sleeve has two reduced ends 23 and 24. These reduced ends pass through the slots 6 and 7 in the side plate of the camera and maintain sliding engagement therewith. The outer ends of these reduced ends are still further reduced to form projections 25a and shoulders on which engages the push-buttons 25, which projections 25a are riveted thereon.

The sleeve 22 engages on the stud 10 and makes sliding engagement therewith. The end of the sleeve 22 is reamed out cone-shaped and is adapted to engage with the beveled inner ends of the dogs 13 and 14. The inside of the sleeve 22 is formed with an annular groove 25b therein.

When the parts are in position as shown in Figure 4, the push-button 25 can be pushed in, carrying the sleeve 22 therewith, the cone-shaped end of the sleeve engages the beveled ends 25c of the dogs and draws the dogs in, bending the spring 17 until the ridge inside of the sleeve passes over a shoulder 25d on the dog and engages in the recess forward of the shoulder. The two dogs 13 and 14 are drawn in simultaneously in this way by pressing on the button 25, and the dogs are held in the position shown in Figure 5, in which position the narrow part of the slot 16 of the link 15 is adapted to ride over it. With the parts of the camera in position as shown in Figure 1, the dogs 13 and 14 are extended and are engaged with the recesses 26 and 27 in the link 15 and securely lock the links with the bed in the open position. When the push-buttons 25 are pressed in, the dogs are drawn to the position shown in Figure 5, and the links 15 are thereby released, so that the narrow part 28 of the slot of the link can pass by the dogs, after which the dogs are engaged by the wider part of the slot to the right of the narrow part of the slot as is shown in Figure 6.

Between the plate 5 of the camera and the push-button 25 is provided a helical spring 30, which is held in place at one end by a boss 31 formed on the inside of the button, with which one end of the spring engages, and at the other end by a cup-shaped recess 32 formed in the plate 5, with which the other end of the spring engages. This spring will normally hold the button in extended position, except when the push-button and its sleeve are locked in the position shown in Figure 5, which is the position that the push-button will occupy when the bed of the camera is closed.

When the bed of the camera is open, the links 15 are drawn down until the narrow part 28 of the slot 16 engages with the dogs. This will cause the dogs to be pushed together and will release the sleeve 22. The spring 30 will then expand and will draw out the sleeve 22 and push-button 25. After the narrow part 28 of the slot has passed the dogs, the dogs will be released and will be pushed out by the spring 17 into engagement with the recesses 26 and 27 in the link 15, and will lock this link in position until the push-button is pushed in again to release the dogs, after which the bed 2 can be swung up to closed position and push the links ahead of it into their closed position.

In Figure 11 the large sleeve 18, and the stud 10, and head 12, and the dogs 13 and 14, and spring 17 are all the same as shown in Figures 4 and 5. The small sleeve 22 is the same as shown in Figures 4 and 7, and the push-button 25 is also the same, except that it is slightly smaller in diameter. Outside of the push-button 25 is provided another push-button 35, and this button is enclosed in a housing 36 which has a flanged end, the reduced outer end of the button extending through the opening in the flanged end. A spring 37 is provided which normally holds the button 35 in its outer position to the left, shown in Figure 11.

In Figure 12 the parts are all the same as shown in Figure 4. A spring plate 40 is added, which is anchored to the plate 5 at 41 and bends out and down over the push-button 25. The push-button 25 will be pushed in by pushing on the spring plate 40. Otherwise the spring plate 40 remains in the position shown, regardless of whether the button 25 is in the position shown in Figure 4 or in Figure 5.

In Figure 13 I have shown the parts the same as is shown in Figures 4 and 5, except that the reduced ends 23 and 24 are spun over at the outer end and are covered over by cap 45, which serves as a push-button, which is integral therewith.

Figure 14 shows the same parts as are shown in Figures 4 and 5, except that a coil spring 50 is substituted for the blade spring 17 between the dogs 13 and 14, the dogs being held apart by the spring 50.

In this Figure 14 I have also changed the shape of the dogs and the sleeve, so that the dogs only have a bevel and the sleeve only has the cone shape with the annular recess omitted. In this form the sleeve does not lock itself on the dogs, because of the absence of the annular groove in the sleeve and the absence of the recesses on the dogs, but the sleeve will nevertheless push the dogs together, and the slot 16 in the link will hold the dogs together, and with such construction the narrow throat 28 of the slot in the link 15 may be omitted.

I claim:

1. In a camera, the combination of a camera box having two sides, a stud projecting inwardly from each of said sides, a camera bed hinged on said box, links pivotally engaged with said bed, said links each having a slot therein with which said links make sliding engagement with said studs, said links having recesses therein extending laterally from the upper end of said slots, each of said studs having a slot therein, dogs mounted in said slots, means for normally pushing said dogs outward into engagement with the sides of the slots of said links, a sleeve sliding on said stud having a cone-shaped seat on the end thereof, said dogs having beveled ends with which said cone-shaped seat is adapted to engage and by which the dogs are drawn inward on the pressing of the sleeve.

2. In a camera, the combination of a camera box having two sides, a stud projecting inwardly from each of said sides, each of said studs having a head thereon, a large sleeve rigidly mounted on each of the sides and extending inwardly, each of said sleeves being concentric with one of said studs, links in said camera, each of said links having a slot therein engaging on one of said studs, each of said links bearing on one side against the head of the stud and on the other side against the end of the stationary sleeve.

3. In a camera, the combination of a camera box having a side, a stud projecting inwardly from said side, a camera bed hinged on said box, a link pivotally engaged with said bed, said link having a slot therein with which said link makes sliding engagement with said stud, said stud having a head thereon with which said link engages on one side, a large sleeve rigidly mounted on the side concentric with said stud, with the end of which sleeve said link engages on the other side.

4. In a camera, the combination of a camera box having a side, a stud projecting inwardly from said side, a link having a slot therein engaging with and sliding on said stud, a head on the end of the stud with which one side of the link makes sliding engagement, means engaging the other side of the link for holding the link close to the head of the stud, said stud having a slot therein, dogs mounted to slide in and out of said slot, means for normally pushing said dogs outward into engagement with the link, a sleeve sliding on said stud adapted to engage said dogs and draw them inwardly into the slot in the stud and out of engagement with the link.

5. In a camera, the combination of a side having slots therein, a stud extending inwardly from said side, a sleeve mounted to slide on said stud, said sleeve having two reduced ends adapted to extend through said slots in the side of the camera, a push-button fastened on the outer end of said reduced ends outside the camera, by which push-button the sleeve inside of the camera may be moved.

6. In a camera, the combination of a side having slots therein, a stud extending inwardly from said side, a sleeve mounted to slide on said stud, said sleeve having two reduced ends adapted to extend through said slots in the side of the camera, a push-button fastened on the outer end of said reduced ends outside the camera, by which push-button the sleeve inside of the camera may be moved, a spring interposed between the push-button and the side of the camera on the outside thereof, said spring being adapted to hold the sleeve and push-button in the outermost position.

7. In a camera, the combination of a side having slots therein, a stud extending inwardly from said side, a sleeve mounted to slide on said stud, said sleeve having two reduced ends adapted to extend through said slots in the side of the camera, a push-button fastened on the outer end of said reduced ends outside the camera, by which push-button the sleeve inside of the camera may be moved, said stud having a slot therein, dogs mounted to slide in said slot, the inner end of said sleeve being adapted to engage with the ends of said dogs to draw the dogs together into the slot.

8. In combination, a camera body, a platform hinged thereto for movement to closed and open positions with respect to said body, means connecting said body and said platform for supporting said platform in its effective open position, means for locking and releasing said supporting means, and compressible means on at least one side of said body for actuating said locking and releasing means.

9. In combination, a camera body, a platform hinged thereto for movement to closed and open positions with respect to said body, means pivoted to said platform and connected to said body for supporting said platform in its effective open position, means for locking and releasing said supporting means, and compressible means on at least one side of said body for actuating said locking and releasing means.

10. In combination, a camera body, a platform hinged thereto for movement to closed and open positions with respect to said body, means for supporting and locking said platform in a predetermined open position, and actuating means comprising resiliently mounted compressible studs on the sides of said body for releasing said locking means.

11. In combination, a camera body, a platform hinged thereto for movement to closed and open positions with respect to the sides of said body, means connected to said body for supporting and locking said platform in a predetermined opened position, and actuating means comprising resiliently mounted longitudinally compressible studs on the sides of said body for releasing said locking means.

12. In combination, a camera body, a platform hinged thereto for movement to closed and open position with respect to said body, means connected to said body for supporting said platform in open position, means for locking said supporting means in a predetermined position, and means comprising resiliently mounted longitudinally compressible studs on and slidable through the sides of said body for releasing said locking means.

13. In combination, a camera body, a platform hinged thereto for movement to closed and open position with respect to said body, means connected to said body for supporting said platform in open position, means for locking said supporting means in a predetermined position, means for releasing said locking means comprising longitudinally compressible studs slidably mounted through the sides of said body, and actuating means comprising buttons on the outer extending ends of said studs for said releasing means.

14. In combination, a camera body, a platform hinged thereto for movement to closed and open positions with respect to said body, means connected to said body for supporting and locking said platform in a predetermined opened position, and actuating means on said body for releasing said locking means, said actuating means comprising longitudinally slidable members on and through the sides of said body, having cooperative engagement with said supporting means.

15. In combination, a camera body, a platform hinged thereto for movement to closed and open positions with respect to said body, means connected to said body for supporting and locking said platform in a predetermined opened position, and actuating means on said body for releasing said locking means, said actuating means comprising longitudinally slidable members extending through the sides of said body provided with projecting finger pieces on their outer ends and cooperatively engaging said supporting means at their inner ends.

LIONEL R. BELL.